(12) United States Patent
Ohmuro

(10) Patent No.: US 9,885,873 B2
(45) Date of Patent: Feb. 6, 2018

(54) COLOR SEPARATION OPTICAL SYSTEM AND IMAGE PICKUP APPARATUS INCLUDING THE SAME

(71) Applicant: CANON KABUSHIKI KAISHA, Tokyo (JP)

(72) Inventor: Ryuji Ohmuro, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/226,166

(22) Filed: Aug. 2, 2016

(65) Prior Publication Data

US 2017/0045747 A1 Feb. 16, 2017

(30) Foreign Application Priority Data

Aug. 10, 2015 (JP) .................. 2015-158014

(51) Int. Cl.
| | |
|---|---|
| *G02B 27/10* | (2006.01) |
| *G02B 27/14* | (2006.01) |
| *H04N 9/09* | (2006.01) |
| *G02B 27/00* | (2006.01) |
| *G02B 5/22* | (2006.01) |
| *G02B 17/04* | (2006.01) |
| *H04N 9/04* | (2006.01) |

(52) U.S. Cl.
CPC .......... *G02B 27/1013* (2013.01); *G02B 5/22* (2013.01); *G02B 17/04* (2013.01); *G02B 27/0018* (2013.01); *G02B 27/0025* (2013.01); *G02B 27/141* (2013.01); *G02B 27/145* (2013.01); *H04N 9/045* (2013.01)

(58) Field of Classification Search
CPC ... H04N 9/04; H04N 9/09; G02B 5/22; G02B 17/04; G02B 27/141; G02B 27/145
See application file for complete search history.

(56) References Cited

U.S. PATENT DOCUMENTS

| 5,777,674 A | 7/1998 | Ohmuro |
| 6,342,980 B1 * | 1/2002 | Omuro ............... G02B 27/1013 348/338 |

(Continued)

FOREIGN PATENT DOCUMENTS

| JP | H07281012 A | 10/1995 |
| JP | H0973006 A | 3/1997 |

(Continued)

*Primary Examiner* — Abdelaaziz Tissire
(74) *Attorney, Agent, or Firm* — Rossi, Kimms & McDowell LLP

(57) ABSTRACT

The present invention provides a color separation optical system which separates an entrance ray into at least three rays of a first color light, a second color light, and a third color light being different color lights and which guides the three rays respectively to solid-state image pickup elements disposed on different optical paths, the system including a first prism, a second prism, a third prism, and an absorption filter disposed between a second exit surface of the second prism and a third entrance surface of the third prism and configured to absorb the second color light. The third entrance surface of the third prism or a surface of the absorption filter facing the third entrance surface is provided with a second dichroic film which reflects the second color light and transmits the third color light.

7 Claims, 7 Drawing Sheets

(56) References Cited

U.S. PATENT DOCUMENTS

| | | | |
|---|---|---|---|
| 8,310,765 B2 | 11/2012 | Saita | |
| 9,641,816 B2* | 5/2017 | Ohmuro | H04N 9/097 |
| 2003/0007252 A1* | 1/2003 | Saita | G02B 27/1013 |
| | | | 359/638 |
| 2006/0279846 A1* | 12/2006 | Ring | G02B 27/1026 |
| | | | 359/634 |
| 2007/0115376 A1* | 5/2007 | Igarashi | H04N 9/09 |
| | | | 348/262 |
| 2008/0239501 A1* | 10/2008 | Saita | G02B 5/04 |
| | | | 359/634 |
| 2009/0079834 A1* | 3/2009 | Otsu | H04N 5/33 |
| | | | 348/169 |
| 2016/0178917 A1* | 6/2016 | Saita | G02B 5/04 |
| | | | 348/336 |

FOREIGN PATENT DOCUMENTS

| | | | |
|---|---|---|---|
| JP | 2000266915 A | 9/2000 | |
| JP | 4478254 B2 | 6/2010 | |
| JP | 2012047805 A | 3/2012 | |

* cited by examiner

COLOR SEPARATION OPTICAL SYSTEM AND IMAGE PICKUP APPARATUS INCLUDING THE SAME

BACKGROUND OF THE INVENTION

Field of the Invention

The present invention is suitable for a color separation optical system used in an image pickup apparatus such as a television camera and a video camera, the color separation optical system including multiple prisms and dichroic films and configured to separate an entrance light into rays of multiple color lights and guide the separate rays respectively to image pickup elements.

Description of the Related Art

In a television camera and the like, a color separation optical system has been conventionally used as means for separation a ray exiting from an object lens into rays of multiple color lights and guiding the rays respectively to image pickup elements corresponding to the color lights. Many color separation optical systems each have, for example, three prisms and separated the entrance light into rays of three color lights of blue, green, and red.

For example, the color separation optical system has at least three prisms including: a first prism including a dichroic film reflecting the blue light and configured to extract the blue light; a second prism including a dichroic film reflecting the red light, disposed adjacent to the first prism with an air gap provided therebetween, and configured to extract the red light; and a third prism bonded to a surface (second reflection surface) of the second prism provided with the dichroic film, and configured to extract the green light transmitted through the first prism and the second prism.

Generally, a metal coating film is provided on a surface of each solid-state image pickup element used in the image pickup apparatus, and the reflectance thereof is high. In the color separation optical system, out of the color lights subjected to color separation, the color light color-separation in the second prism is reflected on the solid-state image pickup apparatus and thereby causes a ghost light in many cases.

There has been conventionally known a color separation optical system which reduces the ghost light caused by the second prism configured to color-separate the red light in the color separation optical system (U.S. Pat. No. 6,342,980, U.S. Pat. No. 8,310,765). Moreover, there has been known a color separation optical system which includes four prisms of a first prism to a fourth prism in this order from the object lens side and which achieves high resolving power by appropriately setting prism apex angles of the first prism and the second prism (U.S. Pat. No. 5,777,674).

In many image pickup apparatuses, solid-state image pickup elements are used as image pickup means. Accordingly, in the image pickup apparatuses using the solid-state image pickup elements, the ghost light and the interference fringe ghost are generated in many cases. In the color separation optical system described above, the ghost lights are generated by lights reflected on solid-state image pickup element surfaces as follows: the second color light reflected on the entrance surface of the solid-state image pickup element into which the second color light enters is reflected on the second reflection surface of the second prism and then reenters the solid-state image pickup element. In this case, the ghost and the interference fringe ghost are generated.

For example, the second color light color-separate by the second prism is sometimes reflected on the surface of the solid-state image pickup element to go back an optical path through which the light has come, and enters the second prism. Then, this light is reflected on the second reflection surface of the second prism to the inside of the second prism, is totally reflected on the second entrance surface, and thereafter reenters the solid-state image pickup element to generate the ghost light. In another case where total reflection condition is not satisfied in the second entrance surface, a ray is transmitted through the second entrance surface without being totally reflected, travels through the air gap, and is reflected on the first reflection surface of the first prism. Then this ray travels through the second prism and thereafter reenters the solid solid-state image pickup element to generate the interference fringe ghost.

U.S. Pat. No. 6,342,980 and U.S. Pat. No. 8,310,765 disclose the color separation optical systems configured to achieve reduction of the generation of the ghost and the interference fringe ghost. In these techniques, the prism apex angle of the second prism is made large. Accordingly, the sizes of the color separation optical systems tend to be large. In these circumstances, it is important to appropriately set the configuration of the color separation optical system in order to reduce the generation of the ghost and the interference fringe ghost caused by the reflection on the entrance surface of the solid-state image pickup element and obtain an excellent image while achieving size reduction of the color separation optical system.

SUMMARY OF THE INVENTION

An object of the present invention is to provide a color separation optical system by which an excellent image can be easily obtained by reducing generation of a ghost and an interference fringe ghost caused by a ray reflected on an entrance surface of a solid-state image pickup element, and an image pickup apparatus including the same.

A color separation optical system of the present invention is a color separation optical system which separates an entrance ray into at least three rays of different color lights called a first color light, a second color light, and a third color light being color lights and which guides the three rays respectively to solid-state image pickup elements disposed on different optical paths, the color separation optical system including: a first prism including a first entrance surface and a first reflection surface provided with a first dichroic film which reflects the first color light in a ray entering the first prism from the first entrance surface and which transmits the second color light and the third color light; a second prism including a second entrance surface disposed to face the first reflection surface with an air gap provided therebetween, and a second exit surface from which a ray entering from the second entrance surface exits; a third prism including a third entrance surface from which a ray exiting from the second exit surface of the second prism enters the third prism, and a third exit surface from which the ray entering the third prism from the third entrance surface exits; and an absorption filter disposed between the second exit surface of the second prism and the third entrance surface of the third prism and configured to absorb the second color light, wherein the third entrance surface of the third prism or a surface of the absorption filter facing the third entrance surface is provided with a second dichroic film which reflects the second color light and which transmits the third color light.

Further features of the present invention will become apparent from the following description of exemplary embodiments with reference to the attached drawings.

DESCRIPTION OF THE EMBODIMENTS

Preferred embodiments of the present invention will be described below in detail with reference to the attached drawings. A color separation optical system of the present invention separates an entrance ray into at least three rays of different color lights called a first color light, a second color light, and a third color light, and guides the three rays respectively to solid-state image pickup elements disposed on different optical paths.

The color separation optical system includes a first prism having a first entrance surface and a first reflection surface provided with a first dichroic film which reflects the first color light in a ray entering the first prism from the first entrance surface and which transmits the second color light and third color lights. The color separation optical system also includes a second prism having a second entrance surface disposed to face the first reflection surface with an air gap provided therebetween, and a second exit surface from which a ray entering the second prism from the second entrance surface exits.

Furthermore, the color separation optical system includes a third prism having a third entrance surface from which a ray exiting from the second exit surface enters the third prism, and third exit surface from which the ray entering the third prism from the third entrance surface exits. Moreover, the color separation optical system includes an absorption filter disposed between the second exit surface of the second prism and the third entrance surface of the third prism and configured to absorb the second color light. The third entrance surface of the third prism or a surface of the absorption filter 12 facing the third entrance surface is provided with a second dichroic film which reflects the second color light and which transmits the third color light.

In the color separation optical system of the present invention, the second color light in the ray entering the second prism from the second entrance surface exits from the second exit surface of the second prism, travels through the absorption filter, and is reflected on the third entrance surface of the third prism provided with the second dichroic film. Thereafter, the second color light travels through the absorption filter and the second exit surface, enters the second prism, is totally reflected on the second entrance surface of the second prism, and exits from the second prism to enter the image pickup element. In the examples described below, the first color light is blue light, the second color light is red light, and the third color light is green light.

Figure 6:
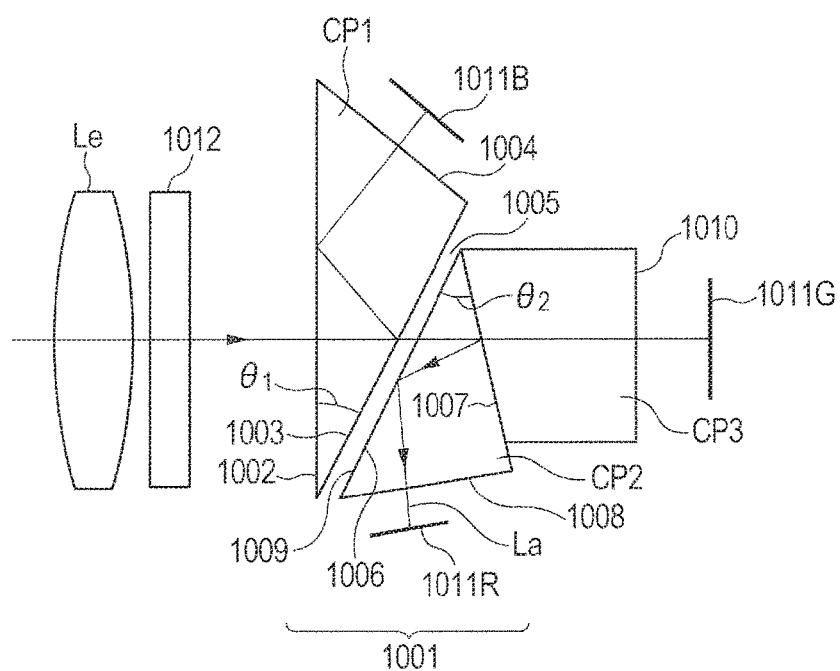
FIG. 6 is a schematic view of a main portion of an image pickup apparatus using the conventional color separation optical system.

Before describing the configuration of the color separation optical system of the present invention, description is given of a configuration a conventional color separation optical system and of a ghost and an interference fringe ghost which are generated when the conventional color separation optical system is used. FIG. 6 illustrates a cross-sectional view of a main portion of an image pickup apparatus (television camera) including the conventional color separation optical system, an object lens, and an absorption filter. The conventional television camera illustrated in FIG. 6 includes, in many cases, an object lens Le, an absorption filter 1012, a color separation prism 1001 configured to color-separate a light passing through the absorption filter 1012, and multiple solid-state image pickup elements.

A ray subjected to color separation in the color separation prism 1001 reaches the solid-state image pickup elements 1011B, 1011G, and 1011R (hereafter, also referred to as solid-state image pickup elements 1011), and each of the solid-state image pickup elements 1011 picks up an image formed of a corresponding color light and converts the image to an electric signal. The absorption filter 1012 is also called color correction filter. The color correction filters include filters of absorption type, of a dichroic film type, and of both types. In this description, the color correction filter is assumed to be the absorption type.

In a first prism CP1 of the color separation prism 1001, only the blue light in the light traveling through the absorption filter 1012 and entering the first prism CP1 from an entrance surface 1002 is reflected on a surface 1003 provided with a dichroic film for blue reflection, and the remaining green light and red light are transmitted through the surface 1003. The reflected blue light is totally reflected on the entrance surface 1002 and exits from a surface 1004 of the first prism CP1 to travel toward the blue solid-state image pickup element 1011B.

A surface 1007 of a second prism CP2 which is provided with a dichroic film for red reflection reflects only the red light in the light transmitted through the surface 1003 and an air gap 1005, and transmits the remaining green light. The red light reflected on the surface 1007 is totally reflected on an entrance surface 1006 of the second prism CP2 which is adjacent to the air gap 1005 and which is provided with an antireflective film 1009 and exits from a surface 1008 to travel toward the red solid-state image pickup element 1011R. The green light transmitted through the surface 1007 and entering a third prism CP3 exits from a surface 1010 to travel toward the green solid-state image pickup element 1011G. By using the optical actions described above, the color separation prism 1001 separates the entrance ray into rays of three colors.

Figure 7:
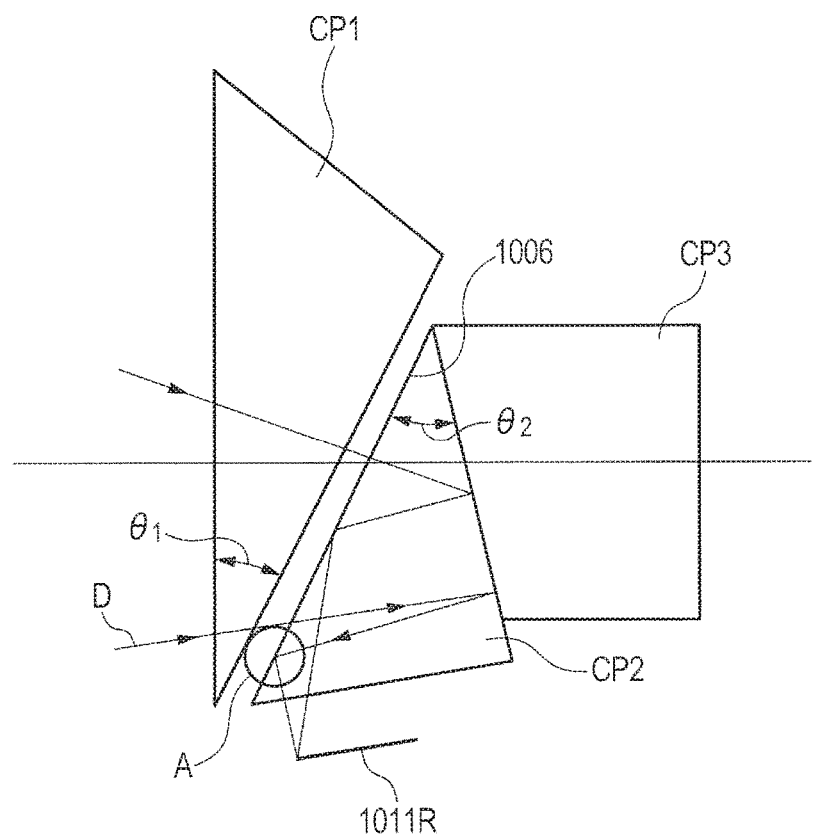
FIG. 7 is an explanatory view of the conventional color separation optical system.

FIG. 7 is an optical path diagram illustrating, out of the rays from the object lens Le illustrated in FIG. 6, rays which travel through the first prism CP1 and the second prism CP2 in the color separation prism 1001 and reach an effective portion of the red solid-state image pickup element 1011R. Out of these rays, a ray denoted by reference sign D is a marginal ray of an off-axis ray traveling through a position closest to an image pickup surface of the solid-state image pickup element 1011R in FIG. 7. The second prism CP2 needs to totally reflect this ray D in a region A on the entrance surface 1006 which is surrounded by a circle in the FIG. 7. In order to totally reflect the ray D, the following formula needs to be satisfied:

$$\theta_2 > (\theta_1 + \delta + \theta max)/2 \quad (1).$$

Note that $\theta_1$: Prism apex angle of first prism CP1
$\theta_2$: Prism apex angle of second prism CP2

$$\delta = \sin^{-1}(1/n)$$

n: Refractive index of material of first prism CP1 and second prism CP2

$$\theta max = \sin^{-1}\{1/(2 \cdot n \cdot Fno)\}$$

Fno: F number of object lens Le.

U.S. Pat. No. 5,777,674 described above discloses that, in order to reduce the size of the color separation prism, $\theta_2$ needs to be set near a lower limit of the aforementioned formula (1) to satisfy a range of $-0.5° < \theta_2 - \{(\theta_1 + \delta + \theta max)/2\} < 5.5°$ . . . formula (1).

As described above, the surface of each solid-state image pickup element is generally provided with a metal coating, and the reflectance thereof is relatively high. Accordingly, when an intense light source (bright object) is directly picked up, reflected light reflected on the surface of the solid-state image pickup element is intense. Moreover, since pixels are regularly arranged on the image pickup surface, the reflected light is reflected while accompanying diffracted light.

Figure 8A:
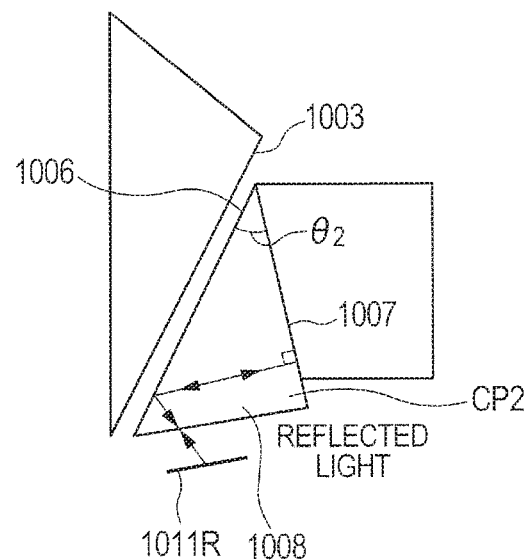
FIGS. 8A and 8B are explanatory views of the conventional color separation optical system.
Figure 8B:
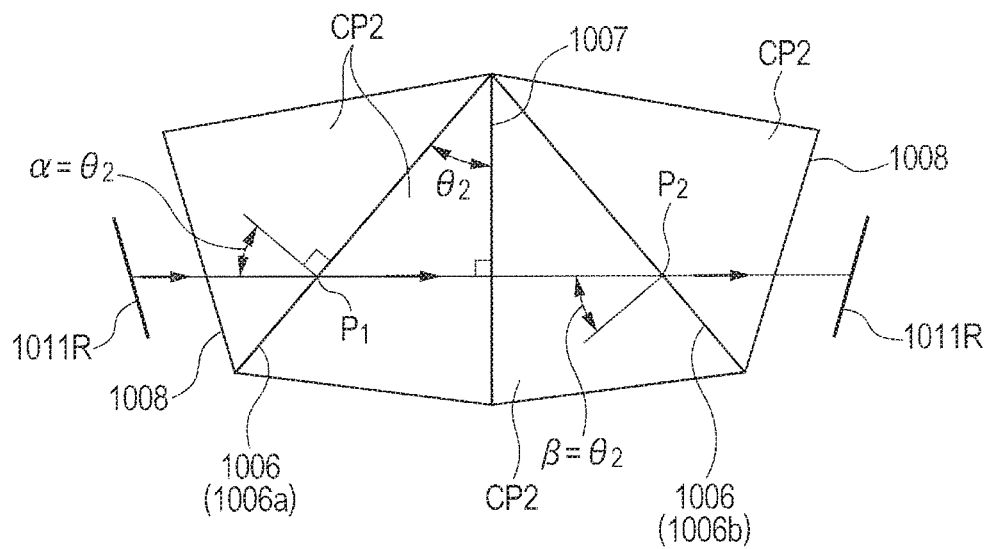

FIGS. 8A and 8B are explanatory views of the effects of reflection in the case described above. FIG. 8A is an explanatory view of an optical path of a light which, after traveling through the second prism CP2 forming the color separation prism 1001 illustrated in FIG. 6 and being reflected on the surface of the solid-state image pickup element 1011R, is reflected on other surfaces and reenters the solid-state image pickup element 1011R to generate the ghost.

FIG. 8B illustrates a schematic view in which one ghost optical path is illustrated and the second prism CP2 is developed along the ghost optical path of FIG. 8A. Particularly, FIG. 8B illustrates a ray which perpendicularly enters the reflection surface 1007 and is reflected thereon. It is found from FIG. 8B that an entrance angle α of a ray entering the surface 1006 immediately after entering the second prism in the light reflected on the solid-state image pickup element and an angle β of this ray reentering the surface 1006 after being reflected on the surface 1007 are both θ2 and are the same.

Conventionally, there has been no problem of such ghosts due to problems of burn-in of a video camera tube. Hence, in an image pickup apparatus using a video camera tube, only the size reduction of the color separation optical system needs to be considered upon determining an allowable range of the prism apex angle $\theta_2$. Specifically, it is only necessary to set the prism apex angle $\theta_2$ to a minimum angle large enough for the total reflection of the light.

For example, the range of $-0.5° < \theta_2 - \{(\theta_1 + \delta + \theta max)/2\}$ also in U.S. Pat. No. 5,777,674 means that a region in which the total reflection condition cannot be slightly satisfied is generated due to size reduction of the color separation optical system. FIG. 8B shows that a point $P_1$ and a point $P_2$ are in this region, and no total reflection occurs at these two points.

Figure 9:
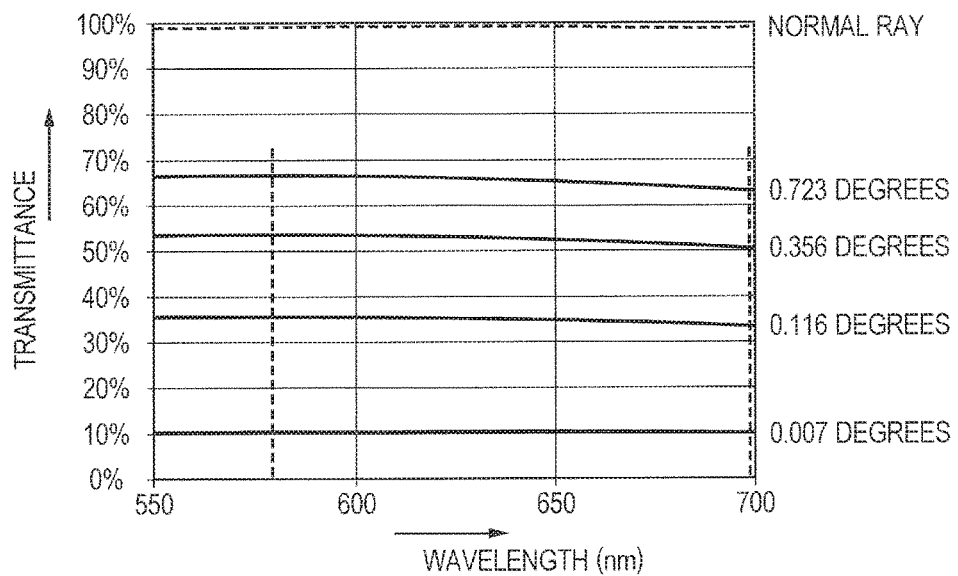
FIG. 9 is an explanatory view of a spectral characteristic of the conventional multilayer antireflective film.

Assume a case where the prism apex angle $\theta_2$ is slightly smaller than the angle δ. FIG. 9 is a view explaining the spectral characteristic of a multilayer antireflective film 1009 provided on the surface 1006. The horizontal axis represents a wavelength (nm) and the vertical axis represents a transmittance of a ray transmitted through the surface 1006. As a matter of course, a transmittance of a main ray (an entrance angle thereof being about 45 degrees) which travels through the air gap 1005 and enters the surface 1006 like a normal ray La illustrated in FIG. 6 is high (a characteristic referred to as normal ray in a top portion of FIG. 9). Then, the ray La which is reflected on the surface 1007 and enters the surface 1006 from the second prism CP2 side at an angle larger than a total reflection critical angle is totally reflected on the surface 1006.

This is the form to be achieved. Meanwhile, lower four curves (lines) illustrated in FIG. 9 indicate the transmittances of rays which enter the surface 1006 at angles smaller than the total reflection critical angle by 0.007 degrees, 0.116 degrees, 0.356 degrees, and 0.723 degrees, respectively, from the bottom. Slight deviation from the total reflection critical angle causes transmittance through the surface 1006 as illustrated in FIG. 9.

With reference to FIG. 8B, since the points $P_1$ and $P_2$ which are reflection points on the surface 1006 of the second prism CP2 are in the region where no total reflection occurs, interference is observed around the points $P_1$ and $P_2$ on the surface 1006 and the surface 1003 across the air gap 1005.

Figure 11A:
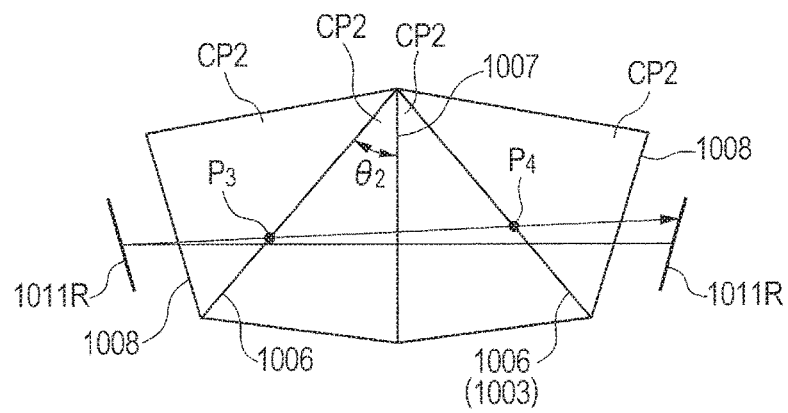
FIGS. 11A and 11B are explanatory views of a ghost generated in conventional color separation.
Figure 11B:
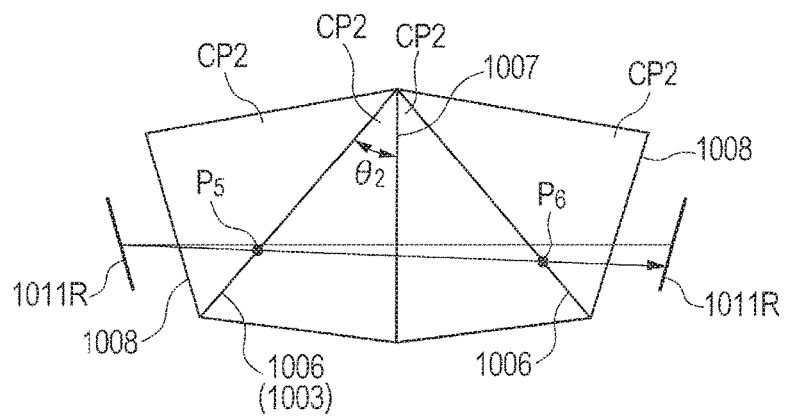

FIGS. 11A and 11B are explanatory views illustrating a ghost optical path in the case where an angle of a ray entering the surface 1007 illustrated in FIGS. 8A and 8B is slightly offset from perpendicular. FIG. 11A is an explanatory view illustrating a ghost optical path of a ray traveling slightly upward in the sheet, and FIG. 11B is an explanatory view illustrating a ghost optical path of a ray traveling slightly downward in the sheet. At points $P_3$ and $P_6$ the entrance angles of the rays entering the surface 1006 are large. Accordingly, the total reflection is more likely to occur and no problem occurs. Meanwhile, at points $P_4$ and $P_5$, the entrance angles of the rays entering the surface 1006 are small. Accordingly, the total reflection condition is not satisfied and the rays are partially reflected on the surface 1003, thereby causing interference fringes.

Figure 12:
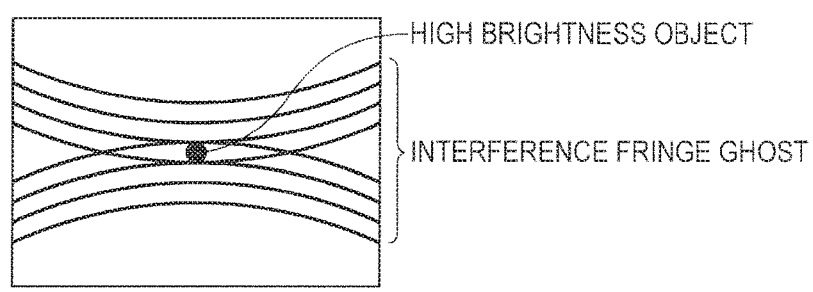
FIG. 12 is an explanatory view of the ghost generated in the conventional color separation.

A ghost with this interference is not so visible when the brightness of an object is low. However, when the brightness of the object is high, the ghost is observed as an interference fringe ghost on a monitor screen as illustrated in FIG. 12. Specifically, interference fringes are generated as a pair of upper and lower interference fringes in an image (on the image pickup element). Moreover, the pair of interference fringes are observed to overlap each other and impair the image quality significantly. Furthermore, the interference of the ghost light is observed to become more notable as the wavelength band of the color light which causes the ghost becomes smaller as in the color separation optical system.

Figure 1:
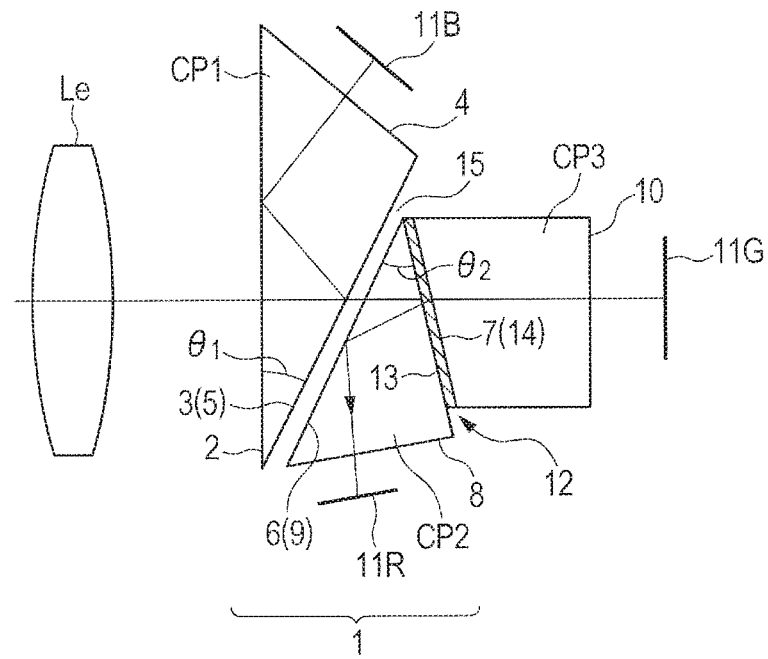
FIG. 1 is a schematic view of a main portion of an image pickup apparatus including a color separation optical system of the present invention.

Next, the configuration of the color separation optical system of the present invention is described. FIG. 1 is a cross-sectional view of a main portion of an image pickup apparatus in Embodiment 1 which uses the color separation optical system of the present invention. In FIG. 1, reference sign Le denotes an object lens (image pickup lens). Reference numeral 1 denotes the color separation optical system (color separation prism). In the embodiment, the object lens Le detachably attached to a not-illustrated camera main body forms an object image. The formed object image is separated into three color lights via the color separation optical system 1 and rays of the color lights are guided respectively to a blue solid-state image pickup element 11B, a green solid-state image pickup element 11G, and a red solid-state image pickup element 11R.

Hereafter, the solid-state image pickup elements 11B, 11G, and 11R are also collectively referred to as solid-state image pickup elements 11. The color separation optical system 1 is disposed between the object lens Le and the solid-state image pickup elements 11, and is configured to separate the light from the object lens Le into color lights of blue, green, and red and guide the color lights respectively to solid-state image pickup elements 11B, 11G, and 11R arranged on different optical paths. Note that the color separation optical system 1 and the solid-state image pickup elements 11 are fixed inside the camera main body.

The color separation optical system 1 includes three prism blocks including a first prism (blue separation prism) CP1, a second prism (red separation prism) CP2 adjacent to the first prism CP1 with an air gap 15 provided therebetween, and a third prism CP3 (green light guiding prism) CP3 which are arranged in this order in a traveling direction of the rays. Note that the refractive indices of materials of the first prism CP1, the second prism CP2, and the third prism CP3 are the same.

Moreover, an absorption filter (hereafter, referred to as absorption filter) 12 configured to absorb the second color light is disposed between the second prism CP2 and the third prism CP3. The absorption filter 12 and the second and third prisms CP2 and CP3 are bonded to one another by adhesive to be integrated.

The first prism CP1 is provided with a blue reflection dichroic film (blue reflection surface) 5 on a reflection surface (first reflection surface) 3 adjacent to the air gap 15, the blue reflection dichroic film 5 formed of a dielectric multilayer film and configured to reflect only the blue light and transmit other lights which are the green light and the red light. The third prism CP3 is provided with a red reflection dichroic film (red reflection surface) 7 on an entrance surface (third entrance surface) 14 which is a bonding surface with the absorption filter 12, the red reflection dichroic film 7 formed of a dielectric multilayer film and configured to reflect only the red light and transmit the remaining green light.

The second prism CP2 is provided with a multilayer antireflective film 9 on an entrance surface (second entrance surface) 6 adjacent to the air gap 15. In this case, a multilayer antireflective film which has been conventionally used is used as the multilayer antireflective film 9.

The color separation optical system 1 receives the light from the object lens Le on an entrance surface (first entrance surface) 2 of the first prism CP1. The received light is separated into a reflected light of the blue component and a transmitted light of the other colors (green light and red light), on the reflection surface (first reflection surface) 3 of the first prism CP1 which is provided with the blue reflection dichroic film 5. The blue light reflected on the reflection surface 3 is totally reflected on the entrance surface 2. Then, the blue light exits from an exit surface 4 and is guided to the solid-state image pickup element 11B for the blue component.

The light (red component and green component) separated by being transmitted through the reflection surface 3 enters the second prism CP2 from the entrance surface (second entrance surface) 6 provided with the multilayer antireflective film 9. The light entering the second prism CP2 enters the absorption filter 12 bonded to a surface (second exit surface) 13 of the second prism CP2. Then, the light reaches the entrance surface (third entrance surface) 14 of the third prism CP3 bonded to a surface of the absorption filter 12 opposite to the second prism CP2, the entrance surface 14 provided with the red reflection dichroic film 7.

A light of the red component in the light reaching the entrance surface 14 is reflected by the entrance surface 14 provided with the red reflection dichroic film 7. Meanwhile, a light of the green component is transmitted through the entrance surface 14. The light of the green component transmitted through the reflection surface 3 provided with the dichroic film 5 and the entrance surface 14 provided with the dichroic film 7 exits from an exit surface (third exit surface) 10 and is guided to the solid-state image pickup element 11G for the green component. Moreover, the red light reflected on the entrance surface 14 travels through the absorption filter 12 and reenters the second prism CP2.

This red light is totally reflected on the entrance surface 6 (reflection surface) of the second prism CP2 which is adjacent to the air gap 15 and which is provided with the multilayer antireflective film 9. The red light then exits from an exit surface 8 and is guided to the solid-state image pickup element 11R for the red component.

Figure 2:
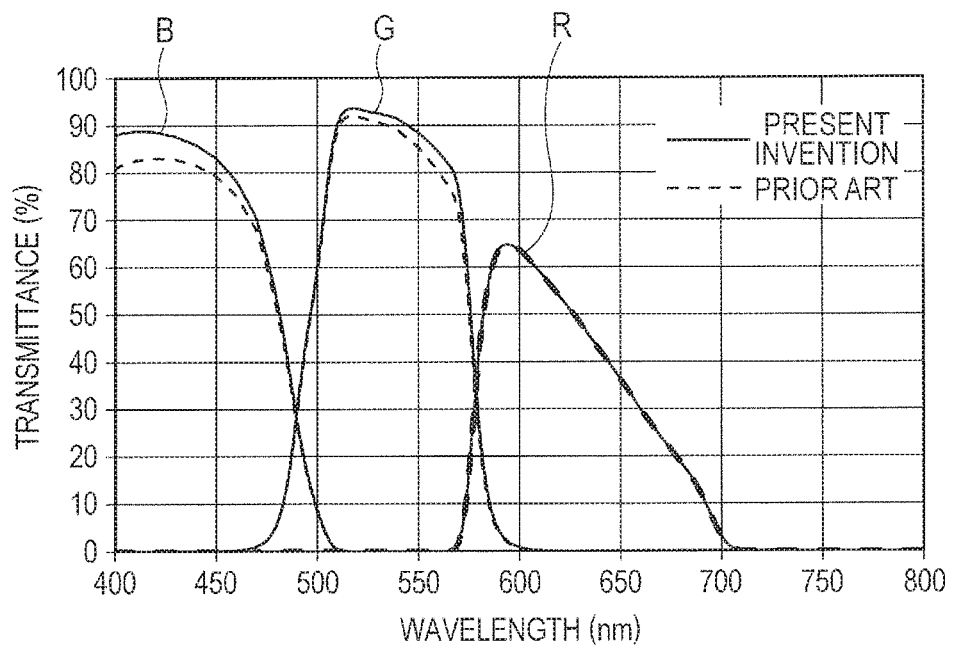
FIG. 2 is an explanatory view of spectral characteristics of color lights color-separated by the color separation optical system of the present invention and a conventional color separation optical system.
Figure 3:
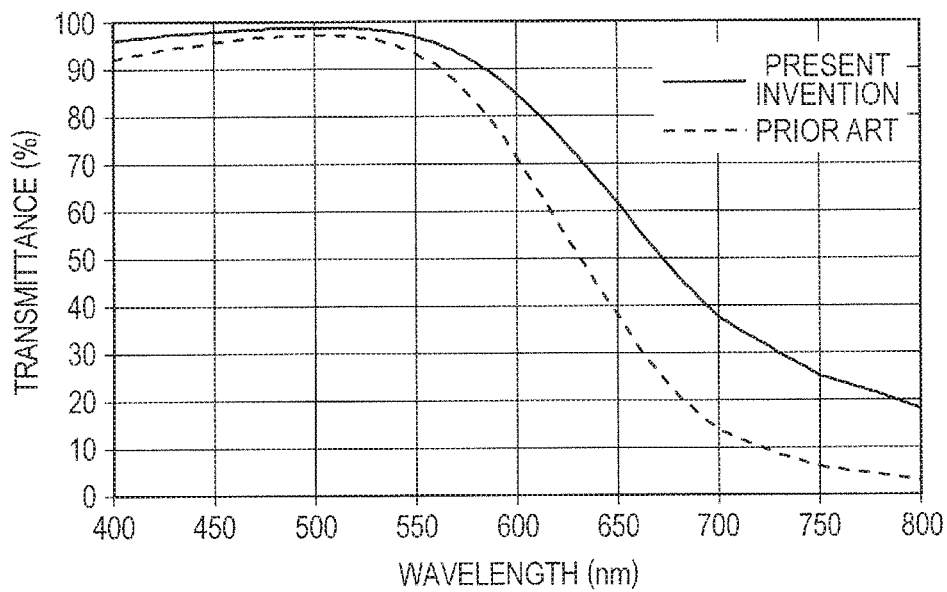
FIG. 3 is an explanatory view of spectral characteristics of an absorption filter of the present invention and a conventional absorption filter.

FIG. 2 is an explanatory view of an overall spectral transmittance in the color separation optical system 1. The solid line in FIG. 2 indicates the overall spectral transmittance in the color separation optical system 1 of the present invention. The broken line in FIG. 2 indicates an overall spectral transmittance in the conventional color separation optical system 1001 illustrated in FIG. 6. The overall spectral transmittance herein refers to multiplication of the color separation optical system and the absorption filter (absorption type). FIG. 3 is an explanatory view of the spectral characteristic of the absorption filter 12 (solid line) in the present invention and the spectral characteristic of the conventional absorption filter 1012 (broken line).

Since the light travels through the absorption filter 12 of the present invention twice, a characteristic corresponding to twice the thickness of the absorption filter 12 is equal to the spectral characteristic of the conventional absorption filter 1012 illustrated in FIG. 6. Accordingly, the spectral characteristics for the red component in FIG. 2 overlap each other.

Since the blue light B in the present invention does not travel through the absorption filter 12, in FIG. 2, the transmittance thereof is improved compared to that in the prior art. Moreover, the thickness of the absorption filter in the present invention is half the thickness of the conventional absorption filter. Accordingly, the green light G in the present invention travels through the absorption filter having only the half the thickness of the prior art, and the transmittance thereof is thus improved. Meanwhile, since the thickness of the absorption filter through which the red light R travels in the present invention is the same as that in the conventional color separation optical system, the spectral characteristics overlap each other as illustrated in FIG. 2.

In the prior art, since the absorption filter is disposed on the object side (light entrance side) of the color separation optical system as illustrated in FIG. 6, the absorption filter greatly affects the blue component and the green component. Meanwhile, in the present invention, the effect of the absorption filter 12 can be eliminated in the blue component and be exponentially reduced in the green component in proportion to the thickness of the absorption filter. The difference due to this is the difference between the solid line and the broken line of FIG. 3.

Figure 4:
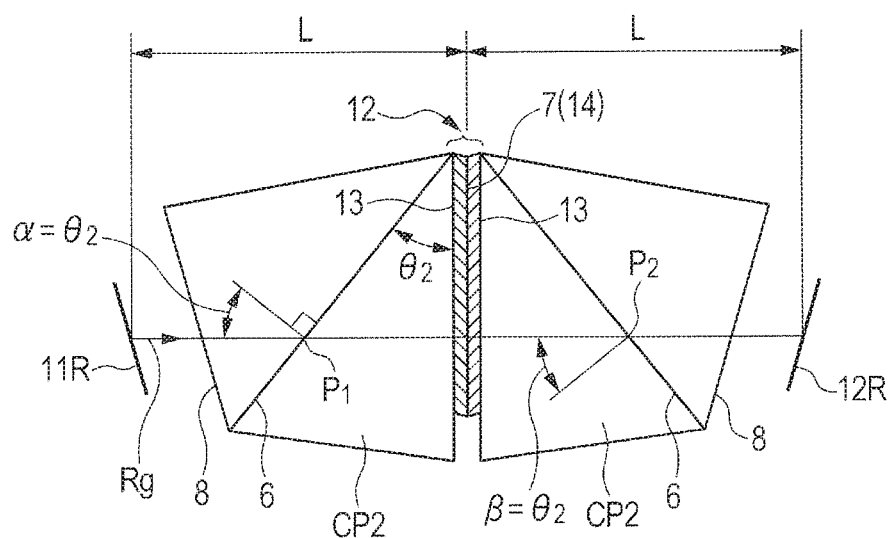
FIG. 4 is an explanatory view of a ray traveling through part of a prism in the color separation optical system of the present invention.

Next, description is given of optical actions and effects for a ghost generated by the color separation optical system 1 of the present invention. FIG. 4 is a cross-sectional view obtained by developing an optical path of a ghost light generated in the second prism CP2. FIG. 4 illustrates an optical path in which the light of the red component having reached the solid-state image pickup element 11R once is reflected on an image pickup surface of the solid-state image pickup element 11R and travels back to the second prism CP2.

The reflected light from the solid-state image pickup element 11R travels sequentially through an optical path from the second prism CP2 to the absorption filter 12, to the red reflection dichroic film 7, to the absorption filter 12, and to the second prism CP2, and reenters the solid-state image pickup element 11R. The prism apex angle $\theta_2$ of the second prism CP2 is an angle between the surface 13 and the surface (entrance surface) 6 on which the light is totally reflected. FIG. 4 is different from the color separation optical system 1001 of the prior art illustrated in FIG. 11A in that the light travels through the absorption filter 12 twice.

FIG. 4 illustrates one ghost optical path and particularly illustrates a ray which perpendicularly enters the entrance surface 14 provided with the dichroic film 7 and is reflected thereon. It is found from FIG. 4 that an entrance angle $\alpha$ of the ray entering the surface 6 immediately after entering the second prism CP2 in the light Rg reflected on the solid-state image pickup element 11R and an angle $\beta$ of this ray reentering the surface 6 after being reflected on the entrance surface 14 are both $\theta_2$ and are the same.

In the present invention, the range of $-0.5°<\theta_2-\{(\theta_1+\delta+\theta max)/2/\}$ is determined for the size reduction of the color separation optical system as in the aforementioned U.S. Pat. No. 5,777,674, although the range does not satisfy the total reflection condition but has only small influence of the light transmitted without being totally reflected. Moreover, in the present invention, the prism apex angle $\theta_2$ of the second prism CP2 is set such that the size reduction of the prism is prioritized.

Figure 5:
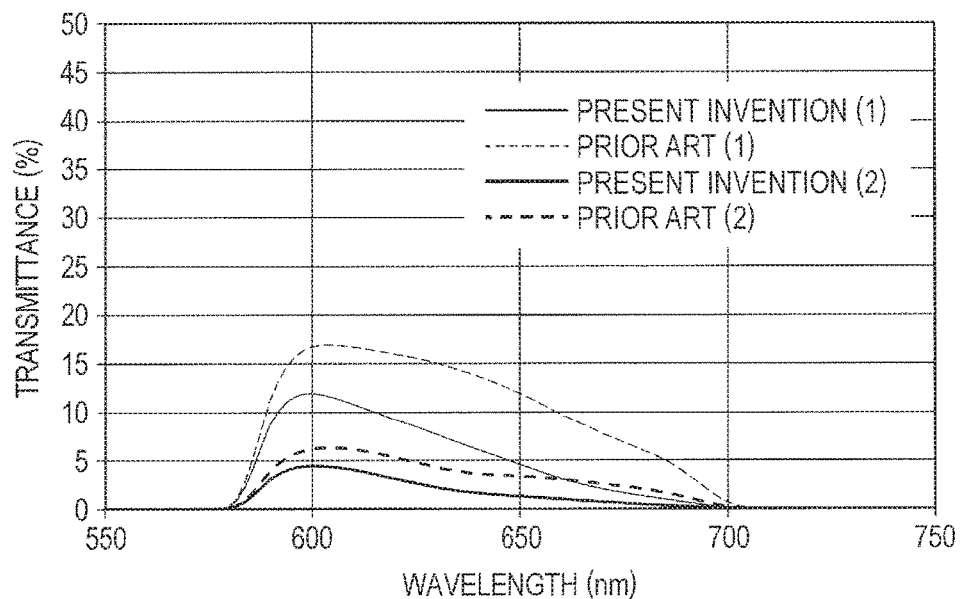
FIG. 5 is an explanatory view of spectral characteristics of multilayer antireflective films of the present invention and prior arts.

FIG. 4 shows that no total reflection occurs at a points $P_1$ and a point $P_2$ which are entrance points of the light Rg into the surface of the second prism CP2. Now, assume a case where the prism apex angle $\theta_2$ is slightly smaller than the angle $\delta$. The thin line in FIG. 5 is an explanatory view of an overall spectral characteristic in the case where reflection occurs on the surface 6 provided with the multilayer antireflective film 9. In this case, the light travels through the optical path described below in the present invention (1) (solid thin line).

Figure 10:
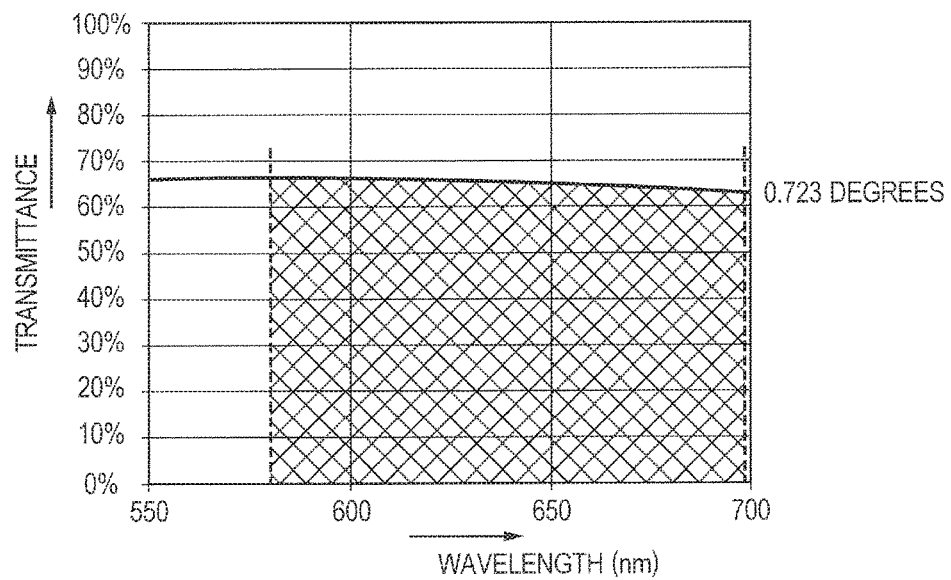
FIG. 10 is an explanatory view of a spectral characteristic of the multilayer antireflective film.

Specifically, the light travels from the first prism CP1 to the second prism CP2 and to the absorption filter 12, is reflected on the surface 14 provided with the red reflection dichroic film 7, and then travels to the absorption filter 12 and to the second prism CP2 (path up to this point is the normal optical path). Then, the light travels from the solid-state image pickup element 11R to the second prism CP2, to the absorption filter 12, to the entrance surface 14 provided with the red reflection dichroic film 7, to the absorption filter 12, to the second prism CP2, and is reflected on the surface 6 provided with the multilayer antireflective film (see FIG. 10). Then, the light travels from the second prism CP2 to the solid-state image pickup element 11R. In this case, for the simplification of description, the solid-state image pickup element 11R is assumed to reflect 100% of light.

Meanwhile, in the prior art (1) of FIG. 5, as illustrated in FIG. 7, the optical path is as follows. Specifically, the light travels from the absorption filter 1012 to the first prism CP1 and to the second prism CP2, is reflected on the surface 1007 provided with the red reflection dichroic film, and then travels through the second prism CP2 (path up to this point is the normal optical path). Then the light travels from the solid-state image pickup element 1011R to the second prism CP2, is reflected on the surface 1007 provided with the red reflection dichroic film, and then travels through the second prism CP2. Next, the light is reflected on the surface 1006 provided with the multilayer antireflective film 1009 (see FIG. 10) and travels through the second prism CP2 and to the solid-state image pickup element 1011R.

The bold line (present invention (2)) in FIG. 5 is a characteristic obtained when the aforementioned portion of "is reflected on the surface 6 provided with the multilayer antireflective film 9" is replaced by "is transmitted through the surface 6 provided with the multilayer antireflective film 9, is reflected on the surface 3 provided with the blue reflection dichroic film 5, is transmitted through the surface 6 provided with the multilayer antireflective film 9." The intensity of the interference can be expressed by using the sum and the difference of the energy of the thin line and the bold line.

The integrated values (values representing the energy of the light) of the characteristics illustrated in FIG. 5 are, assuming that the integrated value for the broken thin line (prior art (1)) is 65, 33 for the solid thin line (present invention (1)), 21 for the broken bold line (prior art (2)), and 11 for the solid bold line (present invention (2)). Accordingly, the interference fringe ghost in the prior art is 65±21 and the contrast is 42. Meanwhile, in the present invention, the interference fringe ghost is 33±11 and the intensity and the contrast can be reduced by half.

In each of the examples, the absorption filter may be formed of a color temperature correction filter taking a spectral characteristic with a color temperature correction action. In the embodiment, the absorption filter conventionally disposed on the object side of the color separation optical system is omitted. However, when the effect of reducing the ghost and the effect of removing the color temperature correction affect each other, there is no need to omit this absorption filter. In the present invention, the examples using the red light as the second color light are described. However, the configuration may be such that the green light is used as the second color light and a neutral density filter or a magenta filter with low density is used instead of the absorption filter. Similar effects can be achieved also in this configuration.

Moreover, although the processing on the surface 13 of the second prism CP2 is not clearly described, the following processing may be performed. For example, when the difference in refractive index between the second prism CP2 and the adhesive is great, antireflection measures such as an antireflective film may be provided on the bonding interface to prevent interference on the bonding surface.

Furthermore, although the reflection surface of the second color light is the entrance surface of the third prism, the reflection surface may be changed to a surface of the absorption filter facing the entrance surface of the third prism. Similar effects can be obtained also in such a configuration. Arrangement changes due to limitations in manufacturing are also conceivable.

As described above, in the present invention, the color separation optical system which is small in size and in which few interference fringe ghosts occur can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-158014, filed Aug. 10, 2015, which is hereby incorporated by reference herein in its entirety.

What is claimed is:

1. A color separation optical system which separates an entrance ray into at least three rays of different color lights called a first color light, a second color light, and a third color light and which guides the three rays respectively to solid-state image pickup elements disposed on different optical paths, the color separation optical system comprising:
    a first prism including a first entrance surface and a first reflection surface provided with a first dichroic film which reflects the first color light in a ray entering the first prism from the first entrance surface and which transmits the second color light and the third color light;
    a second prism including a second entrance surface disposed to face the first reflection surface with an air gap provided therebetween, and a second exit surface from which a ray entering from the second entrance surface exits;
    a third prism including a third entrance surface from which a ray exiting from the second exit surface of the second prism enters the third prism, and a third exit surface from which the ray entering the third prism from the third entrance surface exits; and
    an absorption filter disposed between the second exit surface of the second prism and the third entrance surface of the third prism and configured to absorb the second color light, wherein
    the third entrance surface of the third prism or a surface of the absorption filter facing the third entrance surface is provided with a second dichroic film which reflects the second color light and which transmits the third color light.

2. The color separation optical system according to claim 1, wherein the first color light is blue light, the second color light is red light, and the third color light is green light.

3. The color separation optical system according to claim 1, wherein
    the second color light in the ray entering the second prism from the second entrance surface exits from the second exit surface of the second prism, travels through the absorption filter, is reflected on the third entrance surface of the third prism or the surface of the absorption filter facing the third entrance surface which is provided with the second dichroic film, then travels through the absorption filter and the second exit surface to enter the second prism, is totally reflected on the second entrance surface of the second prism, and exits from the second prism to enter the corresponding image pickup element.

4. The color separation optical system according to claim 1, wherein the absorption filter has a color correction action.

5. The color separation optical system according to claim 2, wherein the absorption filter is configured so that a transmittance of the green light is higher than a transmittance of the red light.

6. The color separation optical system according to claim 5, wherein the absorption filter is configured so that a transmittance of the blue light is higher than a transmittance of the red light.

7. An image pickup apparatus comprising:
    solid-state image pickup elements; and
    a color separation optical system which separates an entrance ray into at least three rays of different color lights called a first color light, a second color light, and a third color light and which guides the three rays respectively to the solid-state image pickup elements disposed on different optical paths, wherein
    the color separation optical system includes:
        a first prism including a first entrance surface and a first reflection surface provided with a first dichroic film which reflects the first color light in a ray entering the first prism from the first entrance surface and which transmits the second color light and the third color light;
        a second prism including a second entrance surface disposed to face the first reflection surface with an air gap provided therebetween, and a second exit surface from which a ray entering from the second entrance surface exits;
        a third prism including a third entrance surface from which a ray exiting from the second exit surface of the second prism enters the third prism, and a third exit surface from which the ray entering the third prism from the third entrance surface exits; and
        an absorption filter disposed between the second exit surface of the second prism and the third entrance surface of the third prism and configured to absorb the second color light,
    the third entrance surface of the third prism or a surface of the absorption filter facing the third entrance surface is provided with a second dichroic film which reflects the second color light and transmits the third color light.

* * * * *